(12) United States Patent
Vijayvergia et al.

(10) Patent No.: US 12,587,088 B1
(45) Date of Patent: Mar. 24, 2026

(54) NEGATIVE DISCHARGE CIRCUIT

(71) Applicant: Synopsys, Inc., Sunnyvale, CA (US)

(72) Inventors: Arpit Vijayvergia, Bhopal (IN); Rahul Gupta, Faridabad (IN); Nitin Bansal, Gurgaon (IN)

(73) Assignee: Synopsys, Inc., Sunnyvale, CA (US)

( * ) Notice: Subject to any disclaimer, the term of this patent is extended or adjusted under 35 U.S.C. 154(b) by 209 days.

(21) Appl. No.: 18/489,141

(22) Filed: Oct. 18, 2023

(51) Int. Cl.
*H02M 1/32* (2007.01)
*H02M 3/07* (2006.01)
(52) U.S. Cl.
CPC ........... *H02M 1/322* (2021.05); *H02M 3/071* (2021.05)
(58) Field of Classification Search
CPC ............................... H02M 1/322; H02M 3/071
See application file for complete search history.

(56) References Cited

U.S. PATENT DOCUMENTS

| | | | | |
|---|---|---|---|---|
| 10,742,052 | B1 * | 8/2020 | Pelicia .................. | H02J 7/0016 |
| 2012/0075010 | A1 * | 3/2012 | De Sandre ............. | G11C 5/145 |
| | | | | 361/220 |
| 2018/0278192 | A1 * | 9/2018 | Simms .................... | H02J 7/345 |

FOREIGN PATENT DOCUMENTS

CN          109427403  A  *  3/2019  ............. G11C 5/145

OTHER PUBLICATIONS

Machine translation of CN109427403 by Clarivate Analytics, Jul. 2025, 12 pages.*
Machine translation of CN 109427403 by Clarivate Analytics, Oct. 2025, 12 pages.*

* cited by examiner

*Primary Examiner* — Harry R Behm
(74) *Attorney, Agent, or Firm* — Davenport IP Law, PLLC

(57) ABSTRACT

A circuit includes a control circuit branch and a discharge circuit branch. The control circuit branch is electrically coupled between a control input node and a negative node. The control circuit branch includes a p-type transistor (MP), a diode, and a first n-type transistor (MN1). A source node of MP is electrically coupled to the control input node. The diode has an anode and a cathode. The anode is electrically coupled to a drain node of MP. A drain node of MN1 is electrically coupled to the cathode. A source node of MN1 is electrically coupled to the negative node. The discharge circuit branch is electrically coupled between the negative node and a discharge node. The discharge circuit branch includes a second n-type transistor (MN2). A drain node of MN2 is electrically coupled to the negative node. A gate node of MN2 is electrically coupled to the cathode.

18 Claims, 6 Drawing Sheets

300
A
C
FIG. 3
400
A
C
FIG. 4
500
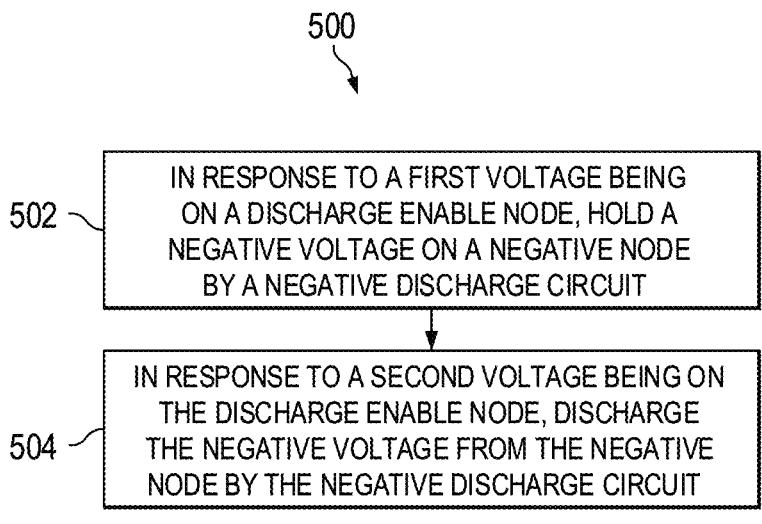
502 — IN RESPONSE TO A FIRST VOLTAGE BEING ON A DISCHARGE ENABLE NODE, HOLD A NEGATIVE VOLTAGE ON A NEGATIVE NODE BY A NEGATIVE DISCHARGE CIRCUIT
504 — IN RESPONSE TO A SECOND VOLTAGE BEING ON THE DISCHARGE ENABLE NODE, DISCHARGE THE NEGATIVE VOLTAGE FROM THE NEGATIVE NODE BY THE NEGATIVE DISCHARGE CIRCUIT
FIG. 5

FIG. 6

NEGATIVE DISCHARGE CIRCUIT

TECHNICAL FIELD

The present disclosure generally relates to an electronic circuit. In particular, the present disclosure relates to a negative discharge circuit and circuits including a negative discharge circuit.

BACKGROUND

Various circuits may implement a negative voltage. A negative charge pump circuit may be implemented to generate a negative voltage from a positive supply voltage in some applications. Some circuits that may use a negative voltage include a well bias circuit, a memory circuit, and power management circuit. In a well bias circuit, a doped well in a fully depleted semiconductor-on-insulator (FDSOI) substrate may be biased with a negative voltage. In a memory circuit, a negative voltage may be applied to gate nodes of high density memory circuits to reduce leakage.

SUMMARY

An example is a circuit. The circuit includes a control circuit branch and a discharge circuit branch. The control circuit branch is electrically coupled between a control input node and a negative node. The control circuit branch includes a p-type transistor, a diode, and a first n-type transistor. The p-type transistor has a first source node, a first drain node, and a first gate node. The first source node is electrically coupled to the control input node. The diode has an anode and a cathode. The anode is electrically coupled to the first drain node of the p-type transistor. The first n-type transistor has a second source node, a second drain node, and a second gate node. The second drain node is electrically coupled to the cathode. The second source node is electrically coupled to the negative node. The discharge circuit branch is electrically coupled between the negative node and a discharge node. The discharge circuit branch includes a second n-type transistor having a third source node, a third drain node, and a third gate node. The third drain node is electrically coupled to the negative node. The third gate node is electrically coupled to the cathode.

Another example is a method. In response to a first voltage being on a discharge enable node, a negative voltage is held on a negative node by a negative discharge circuit. An input node of the negative discharge circuit is electrically connected to the discharge enable node. In response to a second voltage being on the discharge enable node, the negative voltage is discharged from the negative node by the negative discharge circuit. The second voltage is different from the first voltage.

A further example is a non-transitory storage medium storing an electronic representation of a circuit design. The circuit design includes a negative discharge circuit. The negative discharge circuit includes a control circuit branch and a discharge circuit branch. The control circuit branch is electrically coupled between a control input node and a negative node. The control circuit branch includes a p-type transistor, a diode, and a first n-type transistor. The p-type transistor has a first source node, a first drain node, and a first gate node. The first source node is electrically coupled to the control input node. The diode has an anode and a cathode. The anode is electrically coupled to the first drain node of the p-type transistor. The first n-type transistor has a second source node, a second drain node, and a second gate node.

The second drain node is electrically coupled to the cathode. The second source node is electrically coupled to the negative node. The discharge circuit branch is electrically coupled between the negative node and a discharge node. The discharge circuit branch includes a second n-type transistor having a third source node, a third drain node, and a third gate node. The third drain node is electrically coupled to the negative node. The third gate node is electrically coupled to the cathode.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 is a schematic of a diode connected p-type transistor that may be implemented as a diode in the negative discharge circuit of FIG. 2, according to some examples.

FIG. 4 is a schematic of a diode connected n-type transistor that may be implemented as a diode in the negative discharge circuit of FIG. 2, according to some examples.

FIG. 5 is a flow chart of a method of operating the negative discharge circuit of FIG. 2, according to some examples.

FIG. 6 illustrates graphs of voltage and current responses obtained from simulating an example of the negative discharge circuit of FIG. 2.

DETAILED DESCRIPTION

Figure 1:
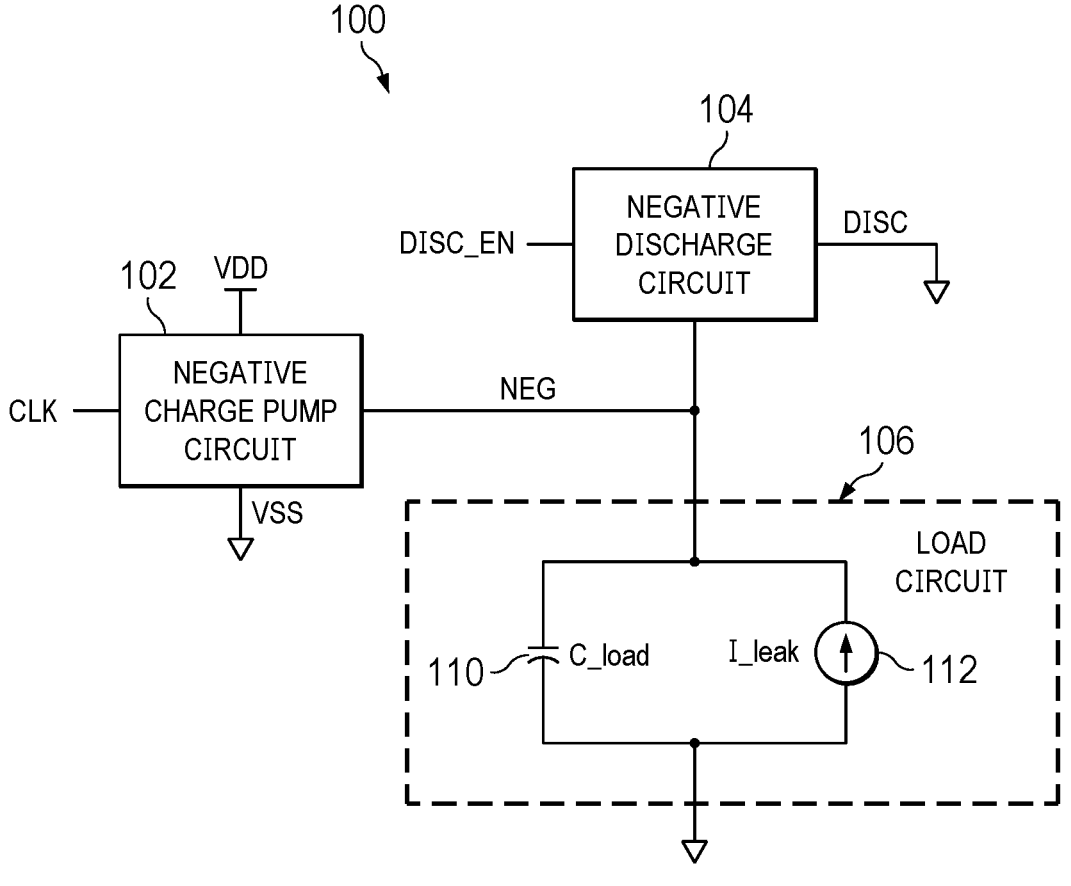
FIG. 1 is a schematic of a circuit including a negative discharge circuit, according to some examples.

Aspects of the present disclosure relate to a negative discharge circuit and circuits including a negative discharge circuit. Various circuits implement a negative voltage and may require regulated charging and discharging of the negative voltage. To obtain a strong discharge to 0 volt (V), a negative discharge circuit may be implemented in such circuits.

Different approaches may be implemented for discharging a negative voltage. Some approaches may implement a positive charge pump circuit or a multi-stage level shifter circuit to discharge a negative voltage. However, these approaches generally consume a high level of power, are complex, require a large circuit area on a semiconductor die, and require a separate circuit loop to regulate the negative voltage. Some other approaches may implement an n-type transistor as a switch to selectively discharge a negative voltage to a ground node. In such approaches, another negative voltage would need to be applied to the gate node of the n-type transistor to hold the negative voltage implemented by the circuit. This results in a challenging paradox in which a negative voltage needs to be generated to generate and hold the negative voltage. This may require another negative charge pump circuit to be implemented to generate the additional negative voltage. Also in such approaches, managing stress to devices during a transient event may be difficult. In any of the above approaches, additional level shifter circuits may be required for addressing stress to devices.

Various examples described herein provide for a negative discharge circuit and circuits that include a negative discharge circuit. A negative discharge circuit, according to some examples, includes a buffer circuit, a control circuit branch, and a discharge circuit branch. The buffer circuit has an input node electrically connected to a discharge enable node and an output node electrically connected to a control input node of the control circuit branch. The control circuit branch includes a p-type transistor, a diode, and a first n-type transistor. A source node of the p-type transistor is electrically coupled to the control input node, and a drain node of the p-type transistor is electrically coupled to an anode of the diode. A cathode of the diode is electrically coupled to a drain node of the first n-type transistor, and a source node of the first n-type transistor is electrically coupled to a negative node. The gate nodes of the p-type transistor and the first n-type transistor are electrically coupled to a ground node. The discharge circuit branch includes a second n-type transistor. A drain node of the second n-type transistor is electrically coupled to the negative node, and a source node of the second n-type transistor may be electrically coupled to a discharge node. A gate node of the second n-type transistor is electrically coupled to the cathode of the diode. In a hold operation, the discharge circuit branch is in an open state (e.g., the second n-type transistor may be in an off or non-conducting state), which permits a negative voltage to be held on the negative node. In a discharge operation, the discharge circuit branch is in a closed state (e.g., the second n-type transistor may be in an on or conducting state), which permits the negative voltage to be discharged from the negative node through the discharge circuit branch. Various modifications may be made to the negative discharge circuit.

Technical advantages of the present disclosure include, but are not limited to, obtaining a strong low magnitude voltage (e.g., 0 V) when discharging a negative voltage. The discharge of the negative voltage from a negative node may have reduced stress on devices electrically coupled to the negative node. A negative discharge circuit discharging the negative voltage may have controllable discharge rates. Over-voltage violations may be reduced or avoided during transient and static conditions. The negative discharge circuit may avoid requiring any additional circuits (such as a level shifter or positive charge pump) for discharging the negative voltage from the negative node. The negative discharge circuit may consume little to no power from a power source during static conditions. The negative discharge circuit may be a simple switch-based (e.g., metal-oxide-semiconductor field effect transistor (MOSFET)) architecture and may be self-biasing. The negative discharge circuit may be a generalized solution usable in any application having a negative voltage independent of technology or process node. Additionally, negative discharge circuits may be cascaded in multiple stages to discharge different negative voltages. Other benefits and advantages may be achieved by various examples.

FIG. 1 is a schematic of a circuit 100, according to some examples. The circuit 100 includes a negative charge pump circuit 102, a negative discharge circuit 104, and a load circuit 106. The negative charge pump circuit 102 may be any appropriate charge pump circuit, an example of which is described in detail subsequently. The load circuit 106 may be any circuit that implements a negative voltage, such as a well bias circuit, in a high density memory circuit to reduce leakage, or the like.

The negative charge pump circuit 102 is electrically coupled between a positive power supply (VDD) node and a negative power supply (VSS) node. The VSS node, in the illustrated example, is or is electrically connected to a ground node. As illustrated in subsequent examples, the VSS node may be electrically connected to a negative node on which a negative voltage is provided, such as when negative charge pump circuits are cascaded. The negative charge pump circuit 102 includes a clock input (CLK) node that receives a CLK signal. The negative charge pump circuit 102 has a negative (NEG) node on which the negative charge pump circuit 102 outputs a negative voltage.

The negative discharge circuit 104 is electrically coupled between the NEG node and a discharge (DISC) node, which may be electrically connected to a ground node in the illustrated example. The negative discharge circuit 104 has a discharge enable (DISC_EN) node from which the negative discharge circuit 104 receives a DISC_EN signal that causes the negative discharge circuit 104 to selectively hold or discharge a negative voltage on the NEG node. The DISC_EN signal may be provided by a controller or processor controlling operation of when a negative voltage is held and discharged. The negative discharge circuit 104 is configured to be selectively enabled to discharge the negative voltage from the NEG node to the DISC node (e.g., which is or is electrically connected to the ground node in the illustrated example) based on the DISC_EN signal.

The load circuit 106 is electrically coupled between the NEG node and the ground node. The load circuit 106 is modeled to include a load capacitance (C_load) 110 and a current leakage (I_leak) 112 electrically connected in parallel and electrically coupled between the NEG node and the ground node. The load circuit 106 is configured to use the negative voltage on the NEG node in performing a function.

Figure 2:
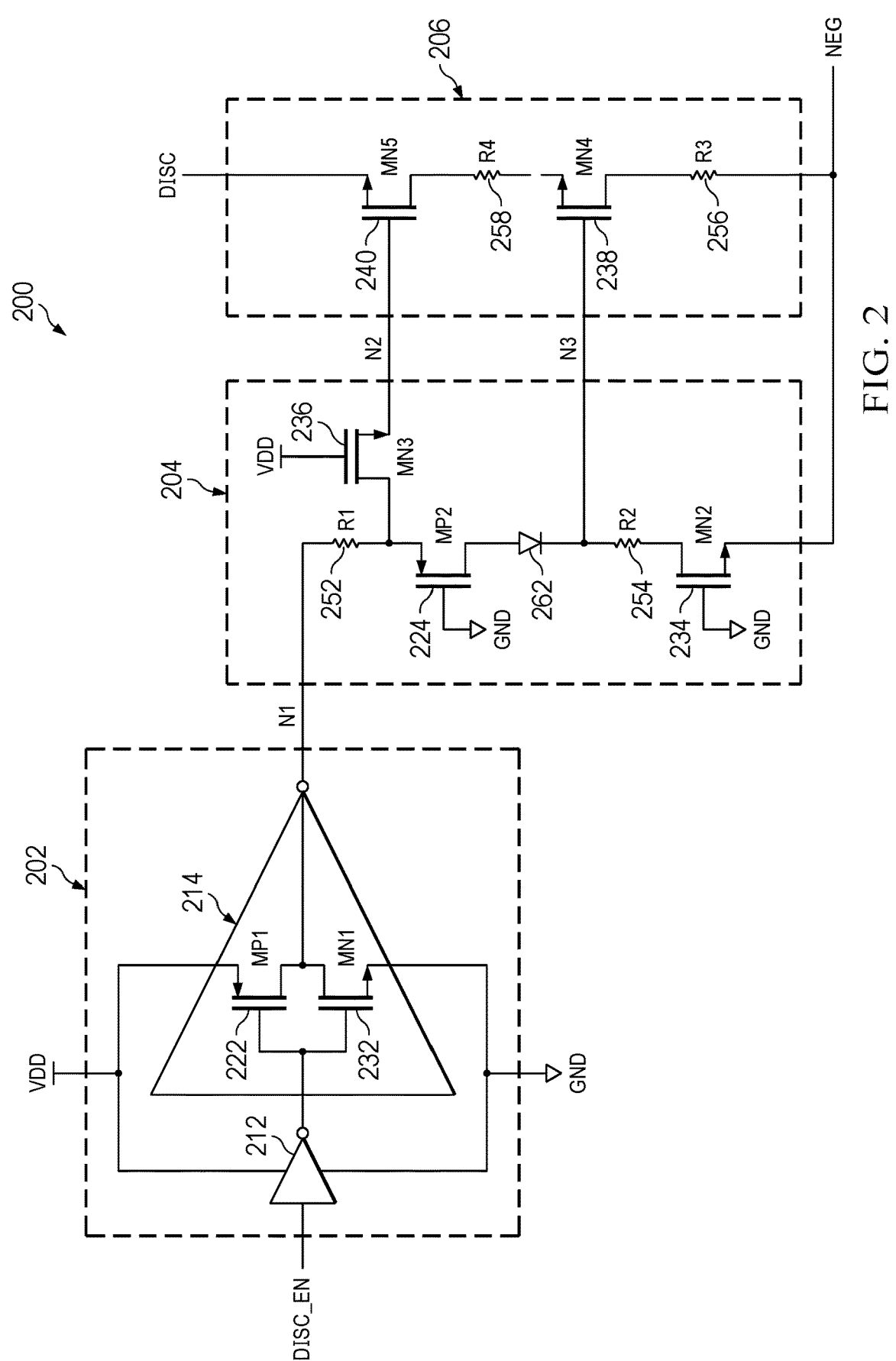
FIG. 2 is a schematic of a negative discharge circuit, according to some examples.

FIG. 2 is a schematic of a negative discharge circuit 200, according to some examples. The negative discharge circuit 200 may be implemented as the negative discharge circuit 104 of FIG. 1. The negative discharge circuit 200 includes a buffer circuit 202, a control circuit branch 204, and a discharge circuit branch 206. The buffer circuit 202 has an input node that is electrically connected to a DISC_EN node and has an output node that is electrically connected to a first control (N1) node. The control circuit branch 204 is electrically coupled between the N1 node and a NEG node. The control circuit branch 204 has a second control (N2) node and a third control (N3) node electrically coupled to the discharge circuit branch 206. The discharge circuit branch 206 is electrically coupled between the NEG node and a DISC node.

The buffer circuit 202 includes a first inverter 212 and a second inverter 214. The inverters 212, 214 are serially connected. An input node of the first inverter 212 is the input node of the buffer circuit 202 and is electrically connected to the DISC_EN node. An output node of the first inverter 212 is electrically connected to an input node of the second inverter 214. An output node of the second inverter 214 is the output node of the buffer circuit 202 and is electrically connected to the N1 node. The inverters 212, 214 are electrically connected to a VDD node and a ground (GND) node. As illustrated, the second inverter 214 includes a first p-type transistor (MP1) 222 and a first n-type transistor (MN1) 232. Gate nodes of the MP1 222 and the MN1 232 are electrically connected together and form the input node of the second inverter 214. A source node of the MP1 222 is electrically connected to the VDD node. Drain nodes of the MP1 222 and MN1 232 are electrically connected together and form the output node of the second inverter 214 and the buffer circuit 202, which is electrically connected to the N1 node. A source node of the MN1 232 is electrically connected to the GND node. The first inverter 212 may be or include a similar configuration.

The control circuit branch 204 includes a second p-type transistor (MP2) 224, a second n-type transistor (MN2) 234, a third n-type transistor (MN3) 236, a first resistor (R1) 252, a second resistor (R2) 254, and a diode 262. A first terminal of the R1 252 is electrically connected to the N1 node. A second terminal of the R1 252 (opposite from the first terminal) is electrically connected to a source node of the MP2 224 and a drain node of the MN3 236. A gate node of the MN3 236 is electrically connected to the VDD node, and a source node of the MN3 236 is electrically connected to the N2 node. A gate node of the MP2 224 is electrically connected to the GND node. A drain node of the MP2 224 is electrically connected to an anode of the diode 262. A cathode of the diode 262 is electrically connected to the N3 node and a first terminal of the R2 254. A second terminal of the R2 254 (opposite from the first terminal) is electrically connected to a drain node of the MN2 234. A gate node of the MN2 234 is electrically connected to the GND node, and a source node of the MN2 234 is electrically connected to the NEG node.

The discharge circuit branch 206 includes a fourth n-type transistor (MN4) 238, a fifth n-type transistor (MN5) 240, a third resistor (R3) 256, and a fourth resistor (R4) 258. A first terminal of the R3 256 is electrically connected to the NEG node. A second terminal of the R3 256 (opposite from the first terminal) is electrically connected to a drain node of the MN4 238. A gate node of the MN4 238 is electrically connected to the N3 node. A source node of the MN4 238 is electrically connected to a first terminal of the R4 258. A second terminal of the R4 258 (opposite from the first terminal) is electrically connected to a drain node of the MN5 240. A gate node of the MN5 240 is electrically connected to the N2 node. A source node of the MN5 240 is electrically connected to the DISC node.

In some examples, the R1 252 and R2 254 may control current spikes during transition conditions or transient events, which may reduce the likelihood of damage to devices of the negative discharge circuit 200. In some circumstances, one or both of the R1 252 and R2 254 may be omitted.

In some examples, the MN5 240 and MN3 236 may prevent leakage during a static condition. If the magnitude of a negative voltage on the NEG node is less than the magnitude of the threshold voltage of the MN2 234, the MN4 238 may be weakly in an on state (e.g., a sub-threshold conducting state). The presence of the MN5 240, which is controlled in part by the MN3 236, may cause the discharge circuit branch 206 to be in an open state when the negative voltage of the NEG node is to not be discharged and may prevent leakage by the MN4 238 from discharging the negative voltage of the NEG node. In some examples, the MN5 240 and MN3 236 may be omitted, such as where such leakage may not be a concern or otherwise obviated. In such examples, the second terminal of the R4 258 and/or the source node of the MN4 238 may be electrically connected to the DISC node.

In some examples, the R3 256 and R4 258 may affect a resistance-capacitance (RC) time constant to discharge the negative voltage on the NEG node. The resistance values of the R3 256 and R4 258, any intrinsic resistance values of the MN4 238, MN5 240, or another device, and the capacitance of the C_load 110 may combine to effectuate the RC time constant. The resistance values of the R3 256 and R4 258 may be modified to achieve a target RC time constant. In some examples, one or both of the R3 256 and R4 258 may be omitted or modified to achieve a target RC time constant.

In some examples, the diode 262 may be implemented by a diode connected transistor. FIG. 3 is a schematic of a diode connected p-type transistor 300 that may be implemented as the diode 262 according to some examples. A source node of the p-type transistor 300 is the anode (A). A gate node and a drain node of the p-type transistor 300 are electrically connected together as the cathode (C). FIG. 4 is a schematic of a diode connected n-type transistor 400 that may be implemented as the diode 262 according to some examples. A gate node and a drain node of the n-type transistor 400 are electrically connected together as the anode (A). A source node of the n-type transistor 400 is the cathode (C). Other devices may be implemented as the diode 262.

FIG. 5 is a flow chart of a method 500 of operating the negative discharge circuit 200 of FIG. 2 according to some examples. In some examples, a negative voltage on the NEG node may be any voltage in a range from zero volts to a negative of a magnitude of the voltage on the VDD node (e.g., $-|V_{VDD}|$). The negative voltage on the NEG node may be generated by a negative charge pump circuit as described above.

At 502, in response to a first voltage being on the DISC_EN node, the negative voltage on the NEG node is held by the negative discharge circuit 200. The negative discharge circuit 200 is configured to hold a negative voltage on the NEG node in a first static condition. In the first static condition, a DISC_EN signal on the DISC_EN node is a logically low voltage (e.g., 0 V and/or the voltage on the GND node), which results in the output node of the buffer circuit 202 (and the N1 node) being a logically low voltage. Within the buffer circuit 202, the logically low voltage on the DISC_EN node is inverted by the first inverter 212 to a logically high voltage, which is output by the first inverter 212 to the gate nodes of the MP1 222 and MN1 232. The logically high voltage causes the MP1 222 to be in an off state (e.g., open state) and the MN1 232 to be in an on state (e.g., closed or conducting state). This results in the voltage of the N1 node to be pulled down to the voltage of the GND node. With the voltage of the N1 node being the voltage of the GND node, the MP2 224 is in an off state. The MN2 234 is in an on state with the negative voltage being on the NEG node. With the MN2 234 in an on state and the MP2 224 in an off state, no current flows through the MN2 234 and the R2 254 resulting in no voltage drop from the NEG node to the N3 node, and the voltage of the N3 node is the negative voltage on the NEG node.

With the voltage on the N3 node being the negative voltage on the NEG node, the MN4 238 is in an off state. Also, with the N1 node being the voltage of the GND node and the MP2 224 being in an off state, the drain node of the MN3 236 is at the voltage of the GND node, and the MN3 236 is in an on state, which results in the voltage of the GND node being applied to the gate node of the MN5 240. The voltage of the GND node being applied to the gate node of the MN5 240 causes the MN5 240 to be in an off state. With both the MN4 238 and the MN5 240 being in off states, the discharge circuit branch 206 is in an open state with no current flowing to the NEG node through the discharge circuit branch 206 (e.g., the R3 256, MN4 238, R4 258, and MN5 240) from the DISC node. The open state of the discharge circuit branch 206 permits the negative voltage of the NEG node to be held by the negative discharge circuit 200.

At 504, in response to a second voltage being on the DISC_EN node, the negative voltage is discharged from the NEG node by the negative discharge circuit 200. The negative charge pump circuit (e.g., the negative charge pump circuit 102 of FIG. 1) is disabled from generating the negative voltage on the NEG node. In discharging the negative voltage, the negative discharge circuit 200 is configured to discharge the negative voltage on the NEG node in a transition condition through a second static condition.

In the transition condition from the first static condition to the second static condition, the DISC_EN signal on the DISC_EN node transitions from the logically low voltage to a logically high voltage, which results in the output node of the buffer circuit 202 (and the N1 node) transitioning from the logically low voltage to a logically high voltage. Within the buffer circuit 202, the logically high voltage on the DISC_EN node is inverted by the first inverter 212 to a logically low voltage, which is output by the first inverter 212 to the gate nodes of the MP1 222 and MN1 232. The logically low voltage causes the MP1 222 to be in an on state and the MN1 232 to be in an off state. This results in the voltage of the N1 node to be pulled up to the voltage of the VDD node. Hence, in the transition condition, the voltage of the N1 node transitions from the voltage of the GND node to the voltage of the VDD node. With the N1 node transitioning to the voltage of the VDD node, the MP2 224 transitions to an on state. The MN2 234 is initially in an on state and remains in an on state until the negative voltage of the NEG node is sufficiently discharged to transition the MN2 234 to an off state, such as when the magnitude of the negative voltage of the NEG node is less than the magnitude of the threshold voltage of the MN2 234. Hence, a current path is formed from the VDD node through the MP1 222, R1 252, MP2 224, diode 262, R2 254, and MN2 234 to the NEG node. During the transition, the voltage of the N3 node reaches the voltage of the VDD node minus the threshold voltage of the diode 262.

As the voltage of the N3 node transitions to the voltage of the VDD node minus the threshold voltage of the diode 262, the MN4 238 transitions to an on state. With the voltage of the N1 node transitioning to the voltage of the VDD node, the MN3 236 is in an on state, and the voltage of the VDD node minus the threshold voltage of the MN3 236 is applied to the N2 node and, hence, to the gate node of the MN5 240. With the voltage of the VDD node minus the threshold voltage of the MN3 236 being applied to the gate node of the MN5 240 and with the MN4 238 being in an on state, the MN5 240 is in an on state. With both the MN4 238 and MN5 240 being in on states, the discharge circuit branch 206 is in a conducting state with current flowing to the NEG node through the discharge circuit branch 206 (e.g., the R3 256, MN4 238, R4 258, and MN5 240) from the DISC node. The conducting state of the discharge circuit branch 206 permits the negative voltage of the NEG node to be discharged to the DISC node through the discharge circuit branch 206 (e.g., the R3 256, MN4 238, R4 258, and MN5 240).

Once a voltage of the NEG node settles to the voltage of the DISC node, the negative discharge circuit 200 enters the second static condition. In the second static condition, the DISC_EN signal on the DISC_EN node is the logically high voltage, as described above in the transition condition. The respective states of the MP1 222, MN1 232, MP2 224, and diode 262 continue as described above with respect to the transition state. In the second static condition, the negative voltage on the NEG node is discharged such that the MN2 234 is in an off state. The voltage of the N3 node is the voltage of the VDD node minus the threshold voltage of the diode 262, and the voltage applied to the gate node of the MN5 240 is the voltage of the VDD node minus the threshold voltage of the MN3 236. These voltages result in the MN4 238 and MN5 240 being in on states, which results in the discharge circuit branch 206 being in a conducting state. The conducting state of the discharge circuit branch 206 permits the negative voltage of the NEG node to be discharged to the DISC node through the discharge circuit branch 206 (e.g., the R3 256, MN4 238, R4 258, and MN5 240).

According to some examples, the first voltage on the DISC_EN node at 502 (e.g., the logically low voltage) and the second voltage on the DISC_EN node at 504 (e.g., the logically high voltage) are non-negative voltages and are different voltages. The first voltage and the second voltage are each 0 V or greater.

The negative discharge circuit 200 may transition from the second static condition to the first static condition. In such circumstance, the DISC_EN signal on the DISC_EN node transitions from the logically high voltage to a logically low voltage. The MP1 222 and MP2 224 transition to off states, and the MN1 232 transitions to an on state. The MN3 236 is in an on state and applies the voltage of the GND node to the gate node of the MN5 240, which results in the MN5 240 being in an off state. The negative charge pump circuit generates and outputs a negative voltage to the NEG node, and the negative voltage on the NEG node causes the MN2 234 to transition to an on state. With the MN2 234 being in an on state, the negative voltage of the NEG node is at the N3 node, which results in the MN4 238 transitioning to an off state.

In the first and second static conditions, no closed current path is in the control circuit branch 204, and no closed current path is in the discharge circuit branch 206. In the first static condition (in a hold operation), the DISC_EN signal is a logically low voltage (e.g., 0 V), which results in at least the MP2 224 being in an off state. MP2 224 being in an off state (among others) prevents current from flowing through the control circuit branch 204 (e.g., through the R1 252, MP2 224, diode 262, R2 254, and MN2 234). Further, as described previously, the MN4 238 and MN5 240 are in off states, which prevents current from flowing through the discharge circuit branch 206. In the second static condition (in a discharge operation once the NEG node reaches the voltage of the DISC node), the MN2 234 is in an off state. MN2 234 being in an off state prevents current from flowing through the control circuit branch 204 (e.g., through the R1 252, MP2 224, diode 262, R2 254, and MN2 234). Also, once the NEG node reaches the voltage of the DISC node, there is no voltage difference between the NEG node and the DISC node, which results in no current flowing through the discharge circuit branch 206.

During a transition from the first static condition to the second static condition, a current path may be formed in the control circuit branch 204, and a current path is in the discharge circuit branch 206. During this transition, the current path in the discharge circuit branch 206 discharges the negative voltage on the NEG node to the DISC node as described above. The current path in the control circuit branch 204 is from the VDD node, which is through the second inverter 214 of the buffer circuit 202. During this transition condition, the MP1 222, MP2 224, and MN2 234 are in on states, which results in current flowing from the VDD node to the NEG node.

During a transition condition from the second static condition to the first static condition, no closed current path may be in the control circuit branch 204, and no closed current path may be in the discharge circuit branch 206. During this transition condition, the MP2 224 transitions to an off state before the MN2 234 transitions from an off state (from the second static condition) to an on state. Hence, MP2 224 and/or MN2 234 being in an off state (among others) prevents current from flowing through the control circuit branch 204 (e.g., through the R1 252, MP2 224, diode 262, R2 254, and MN2 234). Further, assuming that the DISC_EN signal transitions before the negative charge pump circuit is enabled and generates the negative voltage on the NEG node, at least the MN5 240 transitions to an off state before a voltage difference between the NEG node and DISC node is created by the negative charge pump circuit generating the negative voltage. During this transition condition, with at least the MN5 240 being in an off state, no current flows through the discharge circuit branch 206.

Accordingly, the negative discharge circuit 200 may have reduced power consumption from the VDD node. Power from the VDD node is consumed (e.g., through the control circuit branch 204) during the transition condition from the first static condition to the second static condition. During other conditions, generally little (e.g., leakage) to no power may be consumed from the VDD node.

Figure 6:
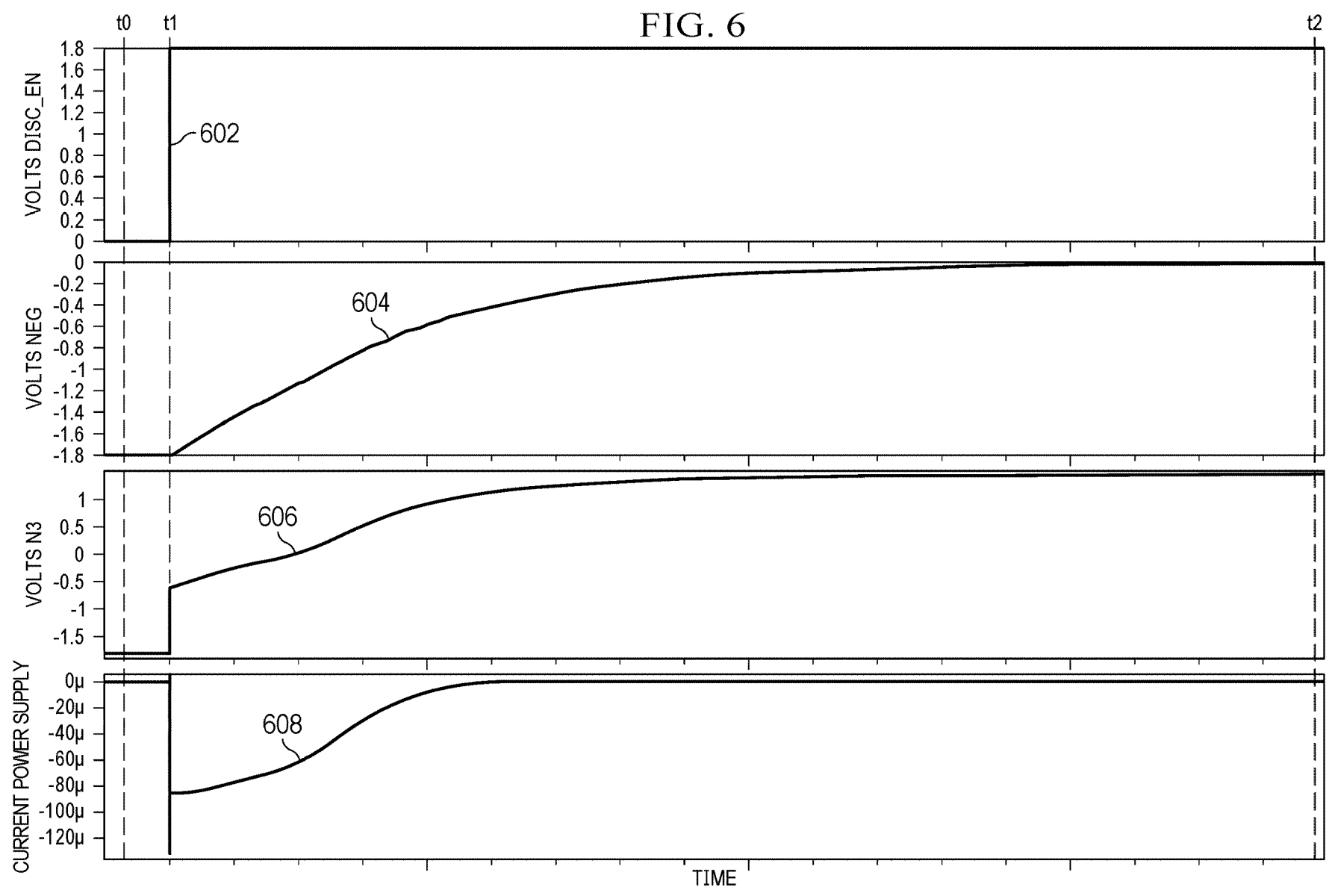

FIG. 6 illustrates graphs of voltage and current responses obtained from simulating an example of the negative discharge circuit 200 of FIG. 2. In this example, the voltage of the VDD node is 1.8 V (e.g., $V_{VDD}$=1.8 V), and the negative voltage of the NEG node is the negative of the voltage of the VDD node, which is-1.8 V (e.g., $V_{NEG}$=-$V_{VDD}$=-1.8 V). FIG. 6 shows a voltage function 602 on the DISC_EN node, a voltage function 604 on the NEG node, a voltage function 606 on the N3 node, and a current function 608 provided by a power supply (e.g., from the VDD node).

FIG. 6 shows the voltage functions 602, 604, 606 while a negative voltage is held on the NEG node in a first static condition (e.g., at time t0) and while the negative voltage is discharged from the NEG node at the beginning of a transition condition (e.g., at time t1) through a second static condition (e.g., at time t2). At time t0, the voltage on the DISC_EN node is 0 V, and at time t1, the voltage on the DISC_EN node transitions to 1.8 V and remains at 1.8 V through time t2. At time t0, the voltage on the NEG node is −1.8 V, and at time t1, the voltage on the NEG node begins to be discharged (e.g., as an exponential decay) to time t2, at which time the voltage on the NEG node is approximately 0 V. The decay of the voltage on the NEG node may be a function of the resistance values of the R3 256 and R4 258 (to effectuate a RC time constant) as described previously. At time t0, the voltage on the N3 node is −1.8 V (e.g., which is the voltage on the NEG node at time t0), and at time t1, the voltage on the N3 node transitions to approximately −0.6 V and subsequently increases to 1.4 V at time t2. At time t0, the current from the power supply is almost 0 A, such as in a picoamp (pA) range, and at time t1, the current has transient spikes, which may be controlled by the R1 252 and R2 254 as described above. At time t2, the current from the power supply almost 0 A, such as in a picoamp (pA) range.

Figure 7:
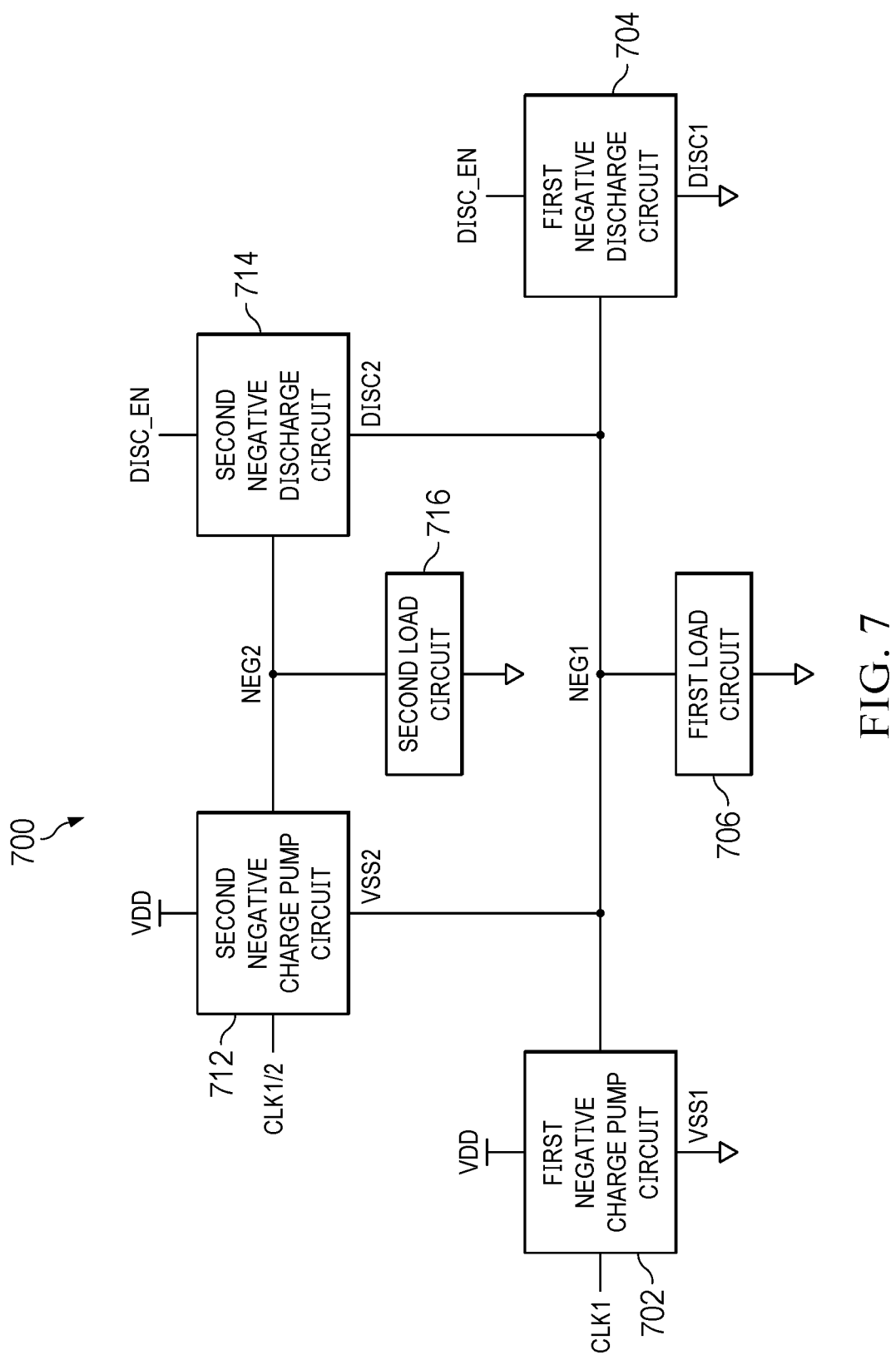
FIG. 7 is a schematic of a circuit including cascaded negative discharge circuits, according to some examples.

FIG. 7 is a schematic of a circuit 700, according to some examples. The circuit 700 is an example circuit including cascaded negative discharge circuits. The circuit 700 includes a first negative charge pump circuit 702, a first negative discharge circuit 704, a first load circuit 706, a second negative charge pump circuit 712, a second negative discharge circuit 714, and a second load circuit 716. The negative charge pump circuits 702, 712 may be any appropriate charge pump circuit. The load circuits 706, 716 may be any circuit that implements a negative voltage. The load circuits 706, 716 may be modeled as described above for the load circuit 106 in FIG. 1.

The first negative charge pump circuit 702 is electrically coupled between a VDD node and a first negative power supply (VSS1) node. The VSS1 node, in the illustrated example, is electrically connected to a ground node. The negative charge pump circuit 102 includes a first clock input (CLK1) node that receives a CLK1 signal. The first negative charge pump circuit 702 has a first negative (NEG1) node on which the first negative charge pump circuit 702 outputs a negative voltage.

The second negative charge pump circuit 712 is electrically coupled between the VDD node and a second negative power supply (VSS2) node. The VSS2 node, in the illustrated example, is or is electrically connected to the NEG1 node. The negative charge pump circuit 102 includes the first clock input or a second clock input (CLK1/2) node that receives the CLK1 signal or a CLK2 signal, respectively. The negative charge pump circuits 702, 712 may receive a same clock signal or different clock signals. The second negative charge pump circuit 712 has a second negative (NEG2) node on which the second negative charge pump circuit 712 outputs a negative voltage. The negative voltage output by the first negative charge pump circuit 702 on the NEG1 node has a magnitude that is less than a magnitude of the negative voltage output by the second negative charge pump circuit 712 on the NEG2 node (e.g., $|V_{NEG2}|>|V_{NEG1}|$ and $V_{NEG2}<V_{NEG1}<0$).

The first load circuit 706 is electrically coupled between the NEG1 node and a ground node, and the second load circuit 716 is electrically coupled between the NEG2 node and a ground node. The load circuits 706, 716 are each configured to use the respective negative voltages on the NEG1 and NEG2 nodes in performing a function.

The first negative discharge circuit 704 is electrically coupled to the NEG1 node. A first discharge (DISC1) node of the first negative discharge circuit 704 is electrically connected to the ground node. The second negative discharge circuit 714 is electrically coupled to the NEG2 node. A second discharge (DISC2) node of the second negative discharge circuit 714 is electrically connected to the NEG1 node. The negative discharge circuits 704, 714 may each be the negative discharge circuit 200 of FIG. 2. For the first negative discharge circuit 704 and the second negative discharge circuit 714, the NEG1 node and NEG2 node correspond to NEG node of the negative discharge circuit 200, respectively. For the first negative discharge circuit 704 and the second negative discharge circuit 714, the DISC1 node and DISC2 node correspond to DISC node of the negative discharge circuit 200, respectively. In the illustrated example, the first negative discharge circuit 704 and the second negative discharge circuit 714 are electrically connected to the same DISC_EN node, which corresponds to the DISC_EN node of the negative discharge circuit 200. In some examples, the DISC_EN nodes of the first negative discharge circuit 704 and the second negative discharge circuit 714 may be different nodes such that the first negative discharge circuit 704 and the second negative discharge circuit 714 may receive different DISC_EN signals and be separately controlled. If different DISC_EN signals are implemented, enabling and disabling the DISC_EN signals in some combinations may stress devices of the negative discharge circuits 704, 714; and hence, the DISC_EN signal may be tightly controlled in such implementations.

The negative voltage on the NEG1 node may be discharged to the ground node (which is electrically connected to the DISC1 node) through the first negative discharge circuit 704. The negative voltage on the NEG2 node may be discharged to the ground node through the second negative discharge circuit 714, the NEG1 node, and the first negative discharge circuit 704. As illustrated, since the first negative discharge circuit 704 and the second negative discharge circuit 714 operate based on the same DISC_EN signal on the same DISC_EN node, the negative voltages on the NEG2 and NEG1 nodes may be discharged simultaneously. By discharging the voltage of the NEG2 node to the NEG1 node through the second negative discharge circuit 714, devices of the second negative discharge circuit 714 may experience less stress compared to, e.g., the DISC2 node being directly electrically connected to the ground node. Any number of NEG nodes and respective negative discharge circuits may be cascaded, where the cascading of the negative discharge circuits have magnitudes of negative voltages on respective NEG nodes that increase like shown in FIG. 7.

Figure 8:
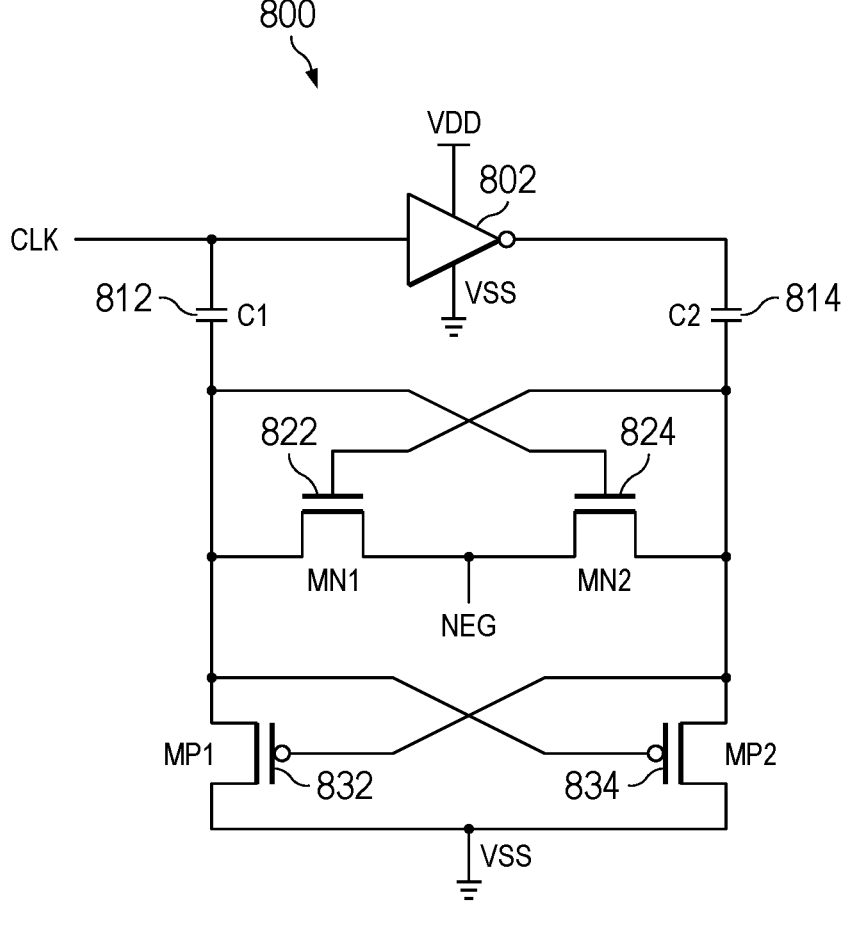
FIG. 8 is a schematic of a negative charge pump circuit that may be implemented in some examples.

FIG. 8 is a schematic of a negative charge pump circuit 800 that may be implemented in some examples. The negative charge pump circuit 800 includes an inverter 802, a first capacitor (C1) 812, a second capacitor (C2) 814, a first n-type transistor (MN1) 822, a second n-type transistor (MN2) 824, a first p-type transistor (MP1) 832, and a second p-type transistor (MP2) 834. An input node of the inverter 802 is electrically connected to a CLK node and to a first terminal of the C1 812. An output node of the inverter 802 is electrically connected to a first terminal of the C2 814. The inverter 802 is has power nodes electrically connected to the VDD node and the VSS node, which in the illustrated example is a ground node but may be a negative node in a cascaded implementation.

A second terminal of the C1 812 (opposite from the first terminal), a gate node of the MN2 824, a drain node of the MN1 822, a gate node of the MP2 834, and a drain node of the MP1 832 are electrically connected together. A second terminal of the C2 814 (opposite from the first terminal), a gate node of the MN1 822, a drain node of the MN2 824, a gate node of the MP1 832, and a drain node of the MP2 834 are electrically connected together. Source nodes of the MN1 822 and MN2 824 are electrically connected together as the NEG node. Source nodes of the MP1 832 and MP2 834 are electrically connected together and to the VSS node, which in the illustrated example is a ground node but may be a negative node in a cascaded implementation.

A CLK signal is applied on the CLK node. As the CLK signal oscillates, the negative charge pump circuit 800 generates the negative voltage on the NEG node. The CLK signal may be disabled (e.g., by setting the CLK signal to a constant logically low or high voltage) to disable the negative charge pump circuit 800 from generating the negative voltage on the NEG node when the NEG node is to be discharged.

Some examples may be embodied as an intellectual property (IP) core (e.g., a digital or electronic representation) stored in a non-transitory storage medium (e.g., memory). For example, a circuit design including a negative discharge circuit 200 may be embodied as an IP core stored in a non-transitory storage medium. Further, for example, a circuit design including a circuit 100, 700 that includes a negative charge pump circuit 102, 702, 712 a negative discharge circuit 104, 200, 704, 714, and a load circuit 106, 706, 716 may be embodied as an IP core stored in a non-transitory storage medium. The IP core may be implemented as a netlist, a circuit schematic, or other representation. A user may be provided access to the IP core stored in the non-transitory storage medium. The user can incorporate the IP core into a user design with or without modification to the IP core. For example, a user may download or otherwise obtain the IP core (including the circuit design including the negative discharge circuit) onto a computing system that implements an electronic design automation (EDA) environment, and may incorporate the IP core into another circuit design using the EDA environment. Examples of a non-transitory storage medium include random access memory (RAM) (e.g., static RAM (SRAM) and dynamic RAM (DRAM)), read only memory (ROM), programmable ROM (PROM), erasable programmable ROM (EPROM), electrically erasable programmable ROM (EEPROM), flash, NAND memory, CD-ROM, an optical storage device, a magnetic storage device, etc. The non-transitory storage medium, in some examples, may be standalone memory, and may be included in any computing system (e.g., a desktop computer, a laptop computer, a server, a database, etc.).

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit comprising:

a first control circuit branch electrically coupled between a control input node and a first negative node, the first control circuit branch including:

a p-type transistor having a first source node, a first drain node, and a first gate node, the first source node being electrically coupled to the control input node;

a diode having an anode and a cathode, the anode being electrically coupled to the first drain node of the p-type transistor;

a first n-type transistor having a second source node, a second drain node, and a second gate node, the second drain node being electrically coupled to the cathode, the second source node being electrically coupled to the first negative node; and a second n-type transistor having a third source node, a third drain node, and a third gate node, the third drain node being electrically connected to the first source node of the p-type transistor; and a first discharge circuit branch electrically coupled between the first negative node and a discharge node, the first discharge circuit branch including:

a third n-type transistor having a fourth source node, a fourth drain node, and a fourth gate node, the fourth drain node being electrically coupled to the first negative node, the fourth gate node being electrically coupled to the cathode; and a fourth n-type transistor having a fifth source node, a fifth drain node, and a fifth gate node, the third source node being electrically connected to the fifth gate node, the fifth drain node being electrically coupled to the fourth source node of the third n-type transistor, the fifth source node being electrically coupled to the discharge node.

2. The circuit of claim 1 further comprising a buffer circuit, the buffer circuit having an input node electrically connected to a discharge enable node and having an output node electrically connected to the control input node.

3. The circuit of claim 1, wherein the first control circuit branch further includes:

a first resistor having a first terminal electrically connected to the control input node and having a second terminal electrically connected to the first source node of the p-type transistor; and a second resistor having a third terminal electrically connected to the cathode and having a fourth terminal electrically connected to the second drain node of the first n-type transistor.

4. The circuit of claim 1, wherein the first discharge circuit branch includes a resistor having a first terminal electrically connected to the first negative node and having a second terminal electrically connected to the fourth drain node of the third n-type transistor.

5. The circuit of claim 1, wherein:

the first gate node of the p-type transistor and the second gate node of the first n-type transistor are each electrically connected to a ground node; and the third gate node of the second n-type transistor is electrically connected to a positive power supply node.

6. The circuit of claim 1, wherein the first discharge circuit branch includes a resistor having a first terminal electrically connected to the fourth source node of the third n-type transistor, and wherein the resistor has a second terminal electrically connected to the fifth drain node of the fourth n-type transistor.

7. The circuit of claim 1, wherein the diode is a diode connected transistor.

8. The circuit of claim 1, further comprising a buffer circuit, the buffer circuit having an input node electrically connected to a discharge enable node and having an output node electrically connected to the control input node, wherein:

the first control circuit branch includes:

a first resistor having a first terminal electrically connected to the control input node and having a second terminal electrically connected to the third drain node and the first source node of the p-type transistor, the third gate node being electrically connected to a positive power supply node, the first gate node of the p-type transistor being electrically connected to a ground node, the first drain node of the p-type transistor being electrically connected to the anode; and a second resistor having a third terminal electrically connected to the cathode and the fourth gate node of the third n-type transistor and having a fourth terminal electrically connected to the second drain node of the first n-type transistor, the second source node of the first n-type transistor being electrically connected to the first negative node, the second gate node of the first n-type transistor being electrically connected to the ground node; and the first discharge circuit branch includes:

a third resistor having a fifth terminal electrically connected to the first negative node and having a sixth terminal electrically connected to the fourth drain node of the third n-type transistor; and a fourth resistor having a seventh terminal electrically connected to the fourth source node of the third n-type transistor and having an eighth terminal electrically connected to the fifth drain node, the fifth source node being electrically connected to the discharge node, the third source node being electrically connected to the fifth gate node.

9. The circuit of claim 1 further comprising:

a first negative discharge circuit including the first control circuit branch and the first discharge circuit branch; and a second negative discharge circuit including a second control circuit branch and a second discharge circuit branch, the second discharge circuit branch being electrically coupled between a second negative node and the first negative node.

10. A method comprising:

in response to a first voltage being on a discharge enable node, holding a negative voltage on a negative node by a negative discharge circuit, an input node of the negative discharge circuit being electrically connected to the discharge enable node; and in response to a second voltage being on the discharge enable node, discharging the negative voltage from the negative node to a discharge node by the negative discharge circuit, the negative discharge circuit including a discharge circuit branch and a control circuit branch, wherein:

the discharge circuit branch includes a first n-type transistor and a second n-type transistor;

a drain node of the first n-type transistor is electrically coupled to the negative node;

a source node of the first n-type transistor is electrically coupled to a drain node of the second n-type transistor;

a source node of the second n-type transistor is electrically coupled to the discharge node;

the negative voltage is discharged through the first n-type transistor and the second n-type transistor;

the control circuit branch includes a p-type transistor, a third n-type transistor, a fourth n-type transistor, and a diode;

a control input node of the control circuit branch has a control input voltage based on a voltage on the discharge enable node;

a source node of the p-type transistor and a drain node of the fourth n-type transistor are electrically coupled to the control input node;

a drain node of the p-type transistor is electrically connected to an anode of the diode;

a cathode of the diode is electrically coupled to a drain node of the third n-type transistor and a gate node of the first n-type transistor;

a source node of the third n-type transistor is electrically connected to the negative node;

a source node of the fourth n-type transistor is electrically connected to a gate node of the second n-type transistor; and the second voltage is different from the first voltage.

11. The method of claim 10, wherein the first voltage and the second voltage are respective non-negative voltages.

12. The method of claim 10, wherein the discharge circuit branch is open in response to the first voltage being on the discharge enable node.

13. The method of claim 10, wherein the control circuit branch is electrically coupled to the discharge circuit branch and configured to cause the discharge circuit branch to be open in response to the first voltage being on the discharge enable node and to discharge the negative voltage through the first n-type transistor and the second n-type transistor in response to the second voltage being on the discharge enable node.

14. The method of claim 10, wherein the negative discharge circuit includes a buffer circuit, an input node of the buffer circuit being electrically connected to the discharge enable node, an output node of the buffer circuit being electrically connected to the control input node.

15. A non-transitory storage medium storing an electronic representation of a circuit design, the circuit design including a negative discharge circuit, the negative discharge circuit comprising:

a control circuit branch electrically coupled between a control input node and a negative node, the control circuit branch including:

a p-type transistor having a first source node, a first drain node, and a first gate node, the first source node being electrically coupled to the control input node;

a diode having an anode and a cathode, the anode being electrically coupled to the first drain node of the p-type transistor;

a first n-type transistor having a second source node, a second drain node, and a second gate node, the second drain node being electrically coupled to the cathode, the second source node being electrically coupled to the negative node; and a second n-type transistor having a third source node, a third drain node, and a third gate node, the third drain node being electrically connected to the first source node of the p-type transistor; and a discharge circuit branch electrically coupled between the negative node and a discharge node, the discharge circuit branch including:

a third n-type transistor having a fourth source node, a fourth drain node, and a fourth gate node, the fourth drain node being electrically coupled to the negative node, the fourth gate node being electrically coupled to the cathode; and a fourth n-type transistor having a fifth source node, a fifth drain node, and a fifth gate node, the third source node being electrically connected to the fifth gate node, the fifth drain node being electrically coupled to the fourth source node of the third n-type transistor, the fifth source node being electrically coupled to the discharge node.

16. The non-transitory storage medium of claim 15, wherein the negative discharge circuit further comprises a buffer circuit, the buffer circuit having an input node electrically connected to a discharge enable node and having an output node electrically connected to the control input node.

17. The non-transitory storage medium of claim 15, wherein the control circuit branch further includes:

a first resistor having a first terminal electrically connected to the control input node and having a second terminal electrically connected to the first source node of the p-type transistor; and a second resistor having a third terminal electrically connected to the cathode and having a fourth terminal electrically connected to the second drain node of the first n-type transistor.

18. The non-transitory storage medium of claim 15, wherein the discharge circuit branch includes a resistor having a first terminal electrically connected to the negative node and having a second terminal electrically connected to the fourth drain node of the third n-type transistor.

* * * * *